US007324242B2

(12) United States Patent
Kishi et al.

(10) Patent No.: US 7,324,242 B2
(45) Date of Patent: Jan. 29, 2008

(54) PHOTOGRAPHIC PROCESSING SYSTEM

(75) Inventors: Takuji Kishi, Wakayama (JP); Kimiharu Otani, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 1118 days.

(21) Appl. No.: 10/237,590

(22) Filed: Sep. 5, 2002

(65) Prior Publication Data

US 2003/0048482 A1 Mar. 13, 2003

(30) Foreign Application Priority Data

Sep. 7, 2001 (JP) ............................ 2001-271286

(51) Int. Cl.

| | |
|---|---|
| ***H04N 1/21*** | (2006.01) |
| ***H04N 1/27*** | (2006.01) |
| ***H04N 1/29*** | (2006.01) |
| ***G06F 3/12*** | (2006.01) |
| ***G06K 15/16*** | (2006.01) |
| ***G07F 11/04*** | (2006.01) |
| ***B65H 29/00*** | (2006.01) |
| ***B65H 39/06*** | (2006.01) |

(52) U.S. Cl. ...................... 358/302; 358/1.1; 358/1.12; 358/296; 221/130; 271/278; 270/52.01

(58) Field of Classification Search ............ 369/30.32, 369/30.41

See application file for complete search history.

(56) References Cited

U.S. PATENT DOCUMENTS

| | | | | |
|---|---|---|---|---|
| 5,666,215 | A * | 9/1997 | Fredlund et al. | 358/487 |
| 5,901,949 | A * | 5/1999 | Muranaka et al. | 270/58.23 |
| 6,666,378 | B2 * | 12/2003 | Davila et al. | 235/487 |
| 6,707,570 | B1 * | 3/2004 | Gotanda et al. | 358/1.15 |
| 6,748,294 | B1 * | 6/2004 | Overman et al. | 700/224 |
| 6,749,190 | B2 * | 6/2004 | Studer | 270/52.14 |
| 7,220,093 | B2 * | 5/2007 | Overman et al. | 414/796.9 |
| 7,222,797 | B2 * | 5/2007 | Davila et al. | 235/487 |
| 2003/0081223 | A1 * | 5/2003 | Panunto et al. | 358/1.1 |
| 2003/0161009 | A1 * | 8/2003 | Yokoo et al. | 358/302 |
| 2004/0256786 | A1 * | 12/2004 | Honegger | 271/9.13 |

(Continued)

FOREIGN PATENT DOCUMENTS

EP 0 828 190 A1 3/1998

(Continued)

*Primary Examiner*—Twyler Lamb
*Assistant Examiner*—Myles D. Robinson
(74) *Attorney, Agent, or Firm*—Knobbe Martens Olsen & Bear, LLP

(57) ABSTRACT

A photographic processing system comprises: a printing unit 3 for forming photographic prints based on image data read out from a negative film; a CD-R writing device 2 for writing the image data in a CD-R; a sorter 14 having numerous trays 14*a* for collecting the photographic prints and the CD-R in an order unit; a lateral conveyor 13 for transporting the photographic prints formed by the printing unit 3 to the sorter 14; a CD-R transporting unit 20 for transporting the CD-R having the image data written therein to the sorter 14; and a control unit 40 for controlling the printing unit, the CD-R writing device and the sorter 14 in such a manner as to collect the photographic prints and the CD-R of the same order in a specific receiver among the numerous trays.

3 Claims, 6 Drawing Sheets

U.S. PATENT DOCUMENTS

2005/0016133 A1* 1/2005 Timmerman et al. ......... 53/550
2005/0067751 A1* 3/2005 Panunto et al. .......... 271/10.01
2005/0082733 A1* 4/2005 Richter et al. ........... 270/52.26
2005/0168781 A1* 8/2005 Nagamatsu et al. ....... 358/1.18
2006/0097440 A1* 5/2006 Bokamper ............... 270/58.23
2007/0069442 A1* 3/2007 Abegglen ................ 270/52.14
2007/0075475 A1* 4/2007 Kapturowski et al. ... 270/52.01

FOREIGN PATENT DOCUMENTS

JP 62-208039 9/1987
JP 4-76548 3/1992
JP 2000-98504 4/2000
JP 2003-75976 3/2003

* cited by examiner

PHOTOGRAPHIC PROCESSING SYSTEM

BACKGROUND OF THE INVENTION

1. Field of the Invention

The present invention relates to a photographic processing system comprising: a printing unit for forming photographic prints based on image data read out from an image forming medium; a recording medium writing device for writing the image data in a recording medium; and a collecting region for collecting the photographic prints and/or the recording medium in an order unit.

2. Description of the Related Art

Such a photographic processing system reads out a frame image of a developed negative film serving as an image forming medium, and prints off the image under exposure to light on a photographic material based on the read-out image data. The photographic material, on which the image is printed off under the exposure to light, is subjected to developing and drying, and then, is discharged as a finished photographic print to the outside of an apparatus. The discharged photographic print is transported to, for example, an collecting unit, which is called a sorter. The collecting unit is configured such that, for example, numerous trays are driven to be circulated, so that photographic prints of one order are placed on one tray.

However, there also is a service by which the image data read out from the frame image of the developed negative film is written in a recording medium. In general, a CD-R is frequently used as such a recording medium. The image data written and recorded in the CD-R is used to be managed or the like by the use of a personal computer or the like.

There is provided a CD-R writing device for writing the data in the CD-R, for writing the read-out image data in the CD-R. Furthermore, an index image is normally printed on a label side of the CD-R. It can be recognized what image is written in the CD-R based on the index image.

However, the photographic processing system in the prior art has experienced problems as follows: namely, in the case where there are both of a request that a frame image of a negative film should be printed and a request that image data should be written in a CD-R, a printing unit forms photographic prints, and further, a CD-R writing device writes the image data in the CD-R. When the finished photographic prints and the CD-R are given to a customer, both of the photographic prints and the CD-R are put together into the same DP bag.

At this time, a position where the finished CD-R is collected and a position where the finished photographic prints are collected are completely different from each other. Consequently, the finished photographic prints and CD-R must be collated with each other in order to prevent any mistake of the order. In view of this, it is necessary to collate the images formed on the photographic prints with the index image printed on the label side of the CD-R. There have arisen problems that this work is cumbersome and takes much time.

The present invention has been accomplished in view of the above-mentioned cases. An object of the present invention is to provide the photographic processing system in which a collating work can be simplified in the case where there are requests for forming the photographic prints and for writing the image data in the recording medium such as a CD-R.

SUMMARY OF THE INVENTION

In order to achieve the above-mentioned object, a photographic processing system according to the present invention comprises:

a printing unit for forming photographic prints based on image data read out from an image forming medium;

a recording medium writing device for writing the image data in a recording medium;

a collecting region for collecting the photographic prints and/or the recording medium in an order unit;

a print transporter for transporting the photographic prints formed by the printing unit to the collecting region;

a recording medium transporting unit for transporting the recording medium having the image data written therein to the collecting region; and a control unit for controlling the printing unit and the recording medium writing device in such a manner as to collect the photographic prints and/or the recording medium of the same order in the collecting region.

Functions and effects of the photographic processing system having the above-described configuration are as follows:

The image data read out from the image forming medium is used for forming the photographic prints in the printing unit while it is used for writing the image data in the recording medium in the recording medium writing device. Furthermore, there is provided a collecting region, in which the formed photographic prints and/or the recording medium are collected in an order unit.

The photographic prints formed by the printing unit are transported to the collecting region by the print transporter. Moreover, the recording medium having the image data written therein also is transported to the collecting region by the recording medium transporting unit. The photographic prints and the recording medium of the same order are collected in the collecting region. Consequently, when an operator puts the photographic prints and the recording medium of the same order together into a DP bag, the operator simply inserts the photographic prints and the recording medium, which are collected in the collecting region, into the DP bag as they are. That is to say, since the photographic prints and the recording medium are collected in the same collecting region, it is unnecessary to visually collate the photographic prints and the recording medium with each other. As a result, it is possible to provide the photographic processing system in which a collating work can be simplified in the case where there are both of the request that the photographic prints should be formed and the request that the image data is written in the recording medium such as the CD-R.

Incidentally, in the case where only the formation of the photographic prints is ordered in the present system, only the photographic prints are collected in the collecting region in an order unit. In contrast, in the case where only the writing to the recording medium is ordered, only the recording medium is collected in the collecting region in an order unit. If both of the formation of the photographic prints and the writing to the recording medium are ordered, both of the photographic prints and the recording medium are collected in the collecting region in an order unit.

In a preferred embodiment according to the present invention, a photographic processing system may further comprise an collecting unit having numerous receivers, which are driven to be circulated, wherein each of the receivers functions as the collecting region.

With this configuration, the photographic prints and/or the recording medium can be collected in the receiver in an order unit. An operator may take out the photographic prints and/or the recording medium placed on the receiver, and then, may insert them into a DP bag as they are. Specific examples of the receiver include a tray.

In another preferred embodiment according to the present invention, in the case where the photographic prints and the recording medium of the same order are collected together, the control unit may perform the control such that the recording medium is first collected in the collecting region, and then, the photographic prints are placed on the recording medium.

In the case where both of the photographic prints and the recording medium are collected in the collecting region, it is preferable that the recording medium should be controlled in such a manner as to be first placed in the collecting region. Since the finished photographic print is curled in a specific direction, the recording medium may possibly slip off and cannot be neatly placed on the photographic prints even if the recording medium is placed on the photographic prints as it is. In contrast, if the recording medium is first placed in the collecting region, the photographic prints can be securely placed on the recording medium.

DETAILED DESCRIPTION OF THE PREFERRED EMBODIMENTS

Figure 1:
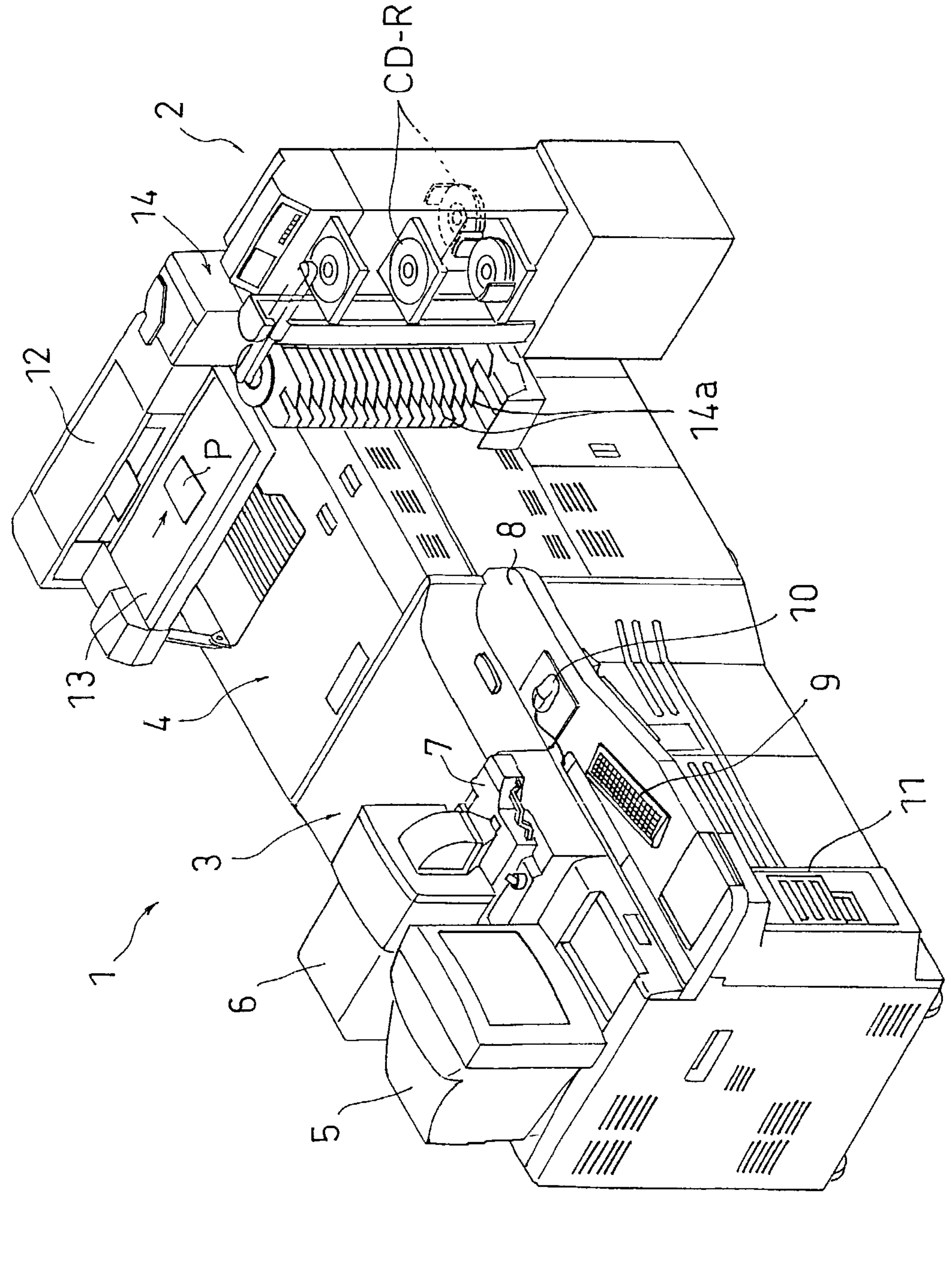
FIG. 1 is a perspective view showing the outside appearance of a photographic processing system.
Figure 2:
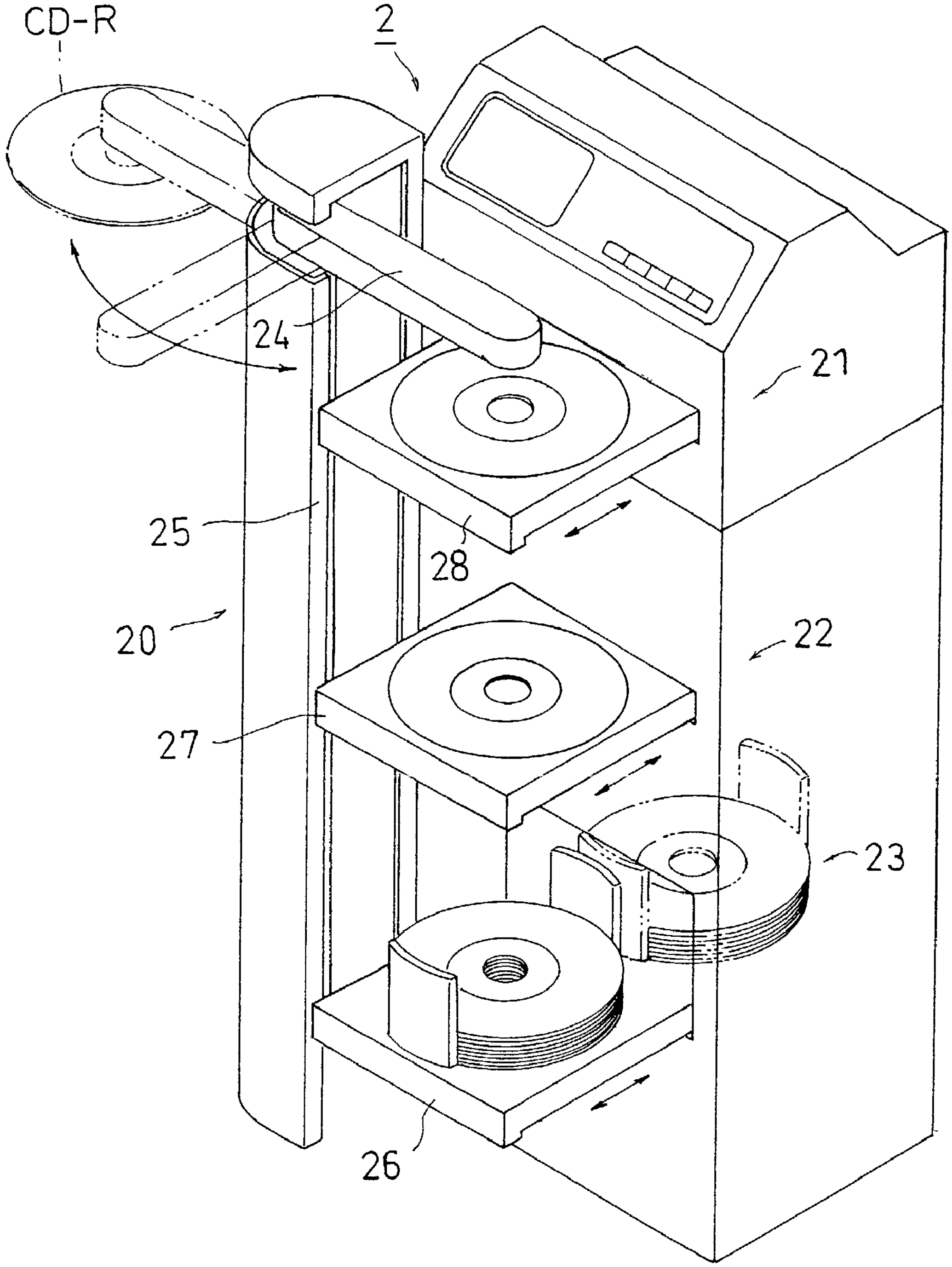
FIG. 2 is a perspective view showing the configuration of a CD-R writing device.

Preferred embodiments of a photographic processing system according to the present invention will be described below in reference to the accompanying drawings. FIG. 1 is a perspective view showing the outside appearance of a photographic processing system; and FIG. 2 is a perspective view showing the configuration of a CD-R writing device in FIG. 1.

<Configuration of Photographic Processing System>

In FIG. 1, the photographic processing system comprises mainly a printer processor 1 and a CD-R writing device 2. The printer processor 1 incorporates therein a printing unit 3 and a processor unit 4. On the printing unit, a monitor 5 and a scanner unit 6 are mounted. To the scanner unit 6, a negative film carrier 7, which can read out a frame image on a negative film (corresponding to an image forming medium) inserted into the negative film carrier 7 is detachably attached. The frame image read out by the scanner unit 6 can be projected on the monitor 5.

In front of the monitor 5 and the scanner unit 6, an operating table 8 is disposed. On the operating table 8, a keyboard 9 and a mouse 10 for inputting various kinds of data and an instruction with respect to the printer processor 1 are mounted. Under the operating table 8, a drive device 11 is provided for inputting image data from various kinds of image forming mediums. For example, image data can be input from a floppy disk, an MO disk or a recording medium for a digital camera via the drive device 11.

The processor unit 4 is provided with a known developing processor and a known drying processor. A sheet of paper, which has been subjected to a predetermined processing, is discharged as a finished photographic print P from a print discharging unit 12 to the outside of the apparatus. The photographic prints P discharged from the print discharging unit 12 are transported toward a sorter 14 (corresponding to a collecting unit) by a lateral conveyor 13 (corresponding to a print transporter). The sorter 14 is configured such that numerous trays 14*a* (corresponding to receivers) are driven to be circulated. The photographic prints P transported by the lateral conveyor 13 are placed on the placing surfaces of the trays 14*a*. Here, the sorter 14, the lateral conveyor 13 and the print discharging unit 12 can be configured by using the technique disclosed in the gazette of Japanese Patent Laid-open Publication No. 118,469/1997.

In FIG. 1, the printer processor 1 and the CD-R writing device 2 are configured independently of each other, and therefore, they are connected to each other via a communication cable, not shown. Consequently, the printer processor 1 and the CD-R writing device 2 can be operated in association with each other. Incidentally, the printer processor 1 and the CD-R writing device 2 are not configured independently of each other, but a photographic processing system may be configured by an integral device obtained by incorporating the function of the CD-R writing device 2 in the printer processor 1.

<Configuration of CD-R Writing Device>

Next, the details of the CD-R writing device 2 will be explained in reference to FIG. 2. The CD-R writing device is a device for writing image data in a CD-R serving as a recording medium. The CD-R writing device is provided with a CD-R transporting unit 20 (corresponding to a recording medium transporting unit), a printing unit 21, a writing unit 22 and a collecting unit 23.

The CD-R transporting unit 20 includes a CD-R picker 24 for picking up and transporting a CD-R and a guide 25 for vertically guiding the CD-R picker 24. The CD-R picker 24 has a pawl member, not shown, for picking up the CD-R by the use of a center hole of the CD-R. The CD-R can be picked up or the picked CD-R can be released by driving the pawl member. The pawl member consists of, for example, three pawl levers arranged at equal intervals along a circumferential direction, and thus, each of the pawl levers may be movably configured along a radial direction.

Moreover, the CD-R picker 24 can be turned at an angle of 180°, as shown in FIG. 2. As a consequence, the processed CD-R can be picked up, to be then placed on a designated tray.

The collecting unit 23 includes a tray 26, which can be moved in a direction indicated by a double-headed arrow. Numerous new CD-Rs, in each of which no data has been written yet, are collected on the tray 26. The writing unit 22 also includes a tray 27, which can be moved in a direction indicated by a double-headed arrow. On the tray 27, image data is written in the CD-R. Here, the image data is written in a predetermined file format. The file format is exemplified in JPEG, a bit map, GIFF and the like, and is not limited to a specific file format.

The printing unit 21 also includes a tray 28, which can be moved in a direction indicated by a double-headed arrow. On the tray 28, an index image is printed on a label side of the CD-R, in which a writing operation has been finished. The index image signifies an image in which numerous thumbnail images of written images are arranged. It is possible to immediately recognize what image data is written by giving a glance at the index image.

<Inside Configuration of Printer Processor>

Figure 3:
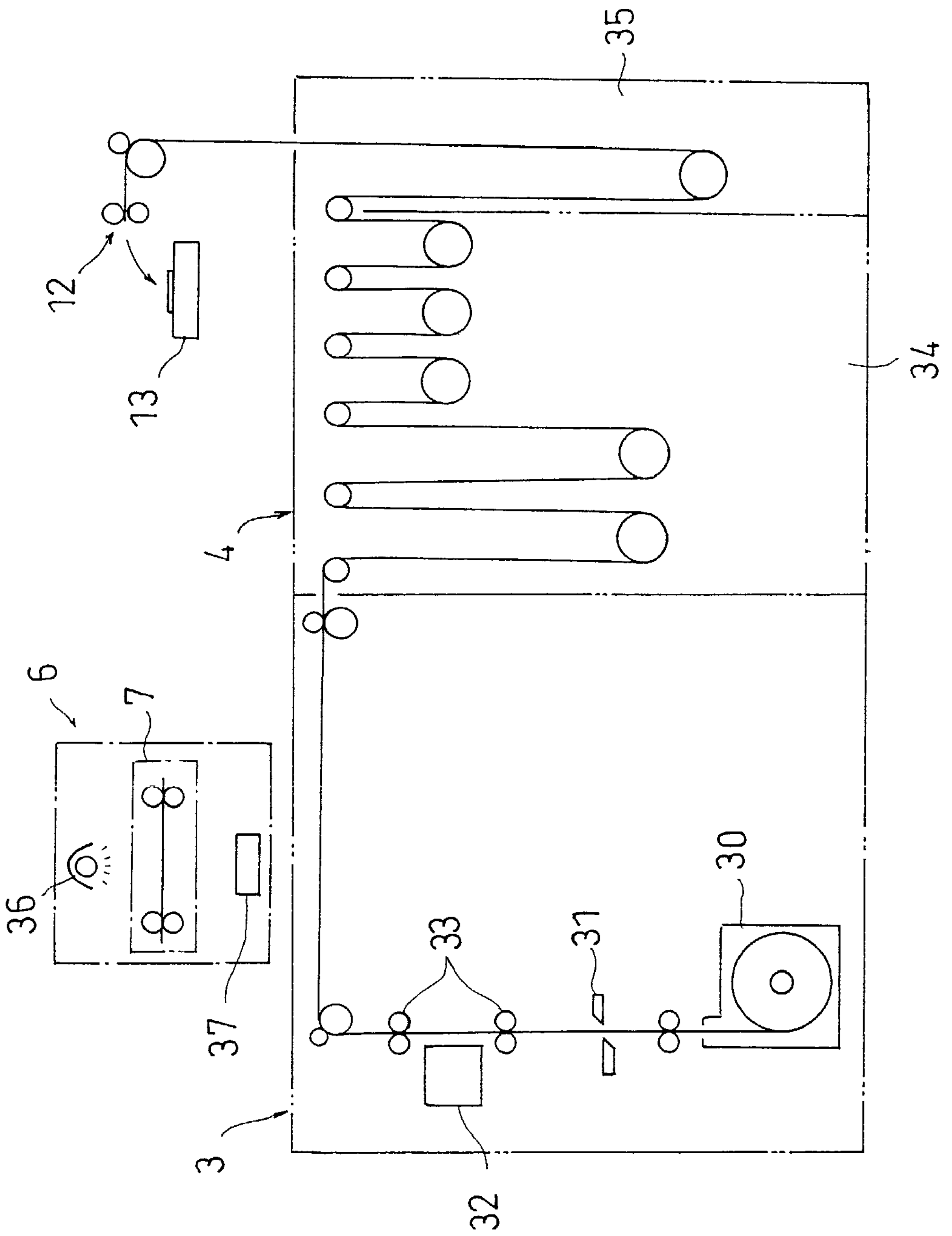
FIG. 3 is a schematic view showing the inside configuration of a printer processor.

Subsequently, brief explanation will be made on the inside configuration of the printer processor 1. FIG. 3 is a schematic view showing the inside configuration. In the printing unit 3, a paper magazine 30 housing therein a roll of paper serving as a photographic material is removably disposed. An elongated sheet of paper drawn from the paper magazine 30 is cut in a print size (i.e., a size of a finished photographic print) by means of a paper cutter 31.

An exposure engine 32 is positioned downstream of the paper cutter 31. The exposure engine 32 is a digital type exposure device, which prints off an image on the sheet of paper under exposure to light based on the image data read out by the scanner unit 6. The sheet of paper is transported at a constant speed by means of exposure transporting rollers 33, and the image is printed off on the sheet of paper line by line in sequence under the exposure to light. The paper transporting direction corresponds to a sub scanning direction; and a scanning direction by the exposure engine 32 corresponds to a main scanning direction. Such an exposure method is referred to as a scanning exposure method. An appropriate type exposure engine can be used as the exposure engine 32. For example, a laser engine, a CRT engine, a PLZT engine and the like can be used as the exposure engine 32.

The processor unit 4 is provided with the developing processor 34 and the drying processor 35. The sheet of paper, onto which the image is printed off under the exposure to light by means of the exposure engine 32, is subjected to known processing in the processor unit 4. The sheet of paper, which has passed through the drying processor 35, is discharged from the print discharging unit 12, as described already.

The scanner unit 6 is adapted to read out a frame image formed on a negative film loaded in the negative film carrier 7. Therefore, the scanner unit 6 incorporates therein a reading light source 36 and a CCD sensor 37. The CCD sensor 37 may be either one of a line sensor and an area sensor. Incidentally, the scanner unit 6 may be configured in other various manners.

<Block Configuration Diagram>

Figure 4:
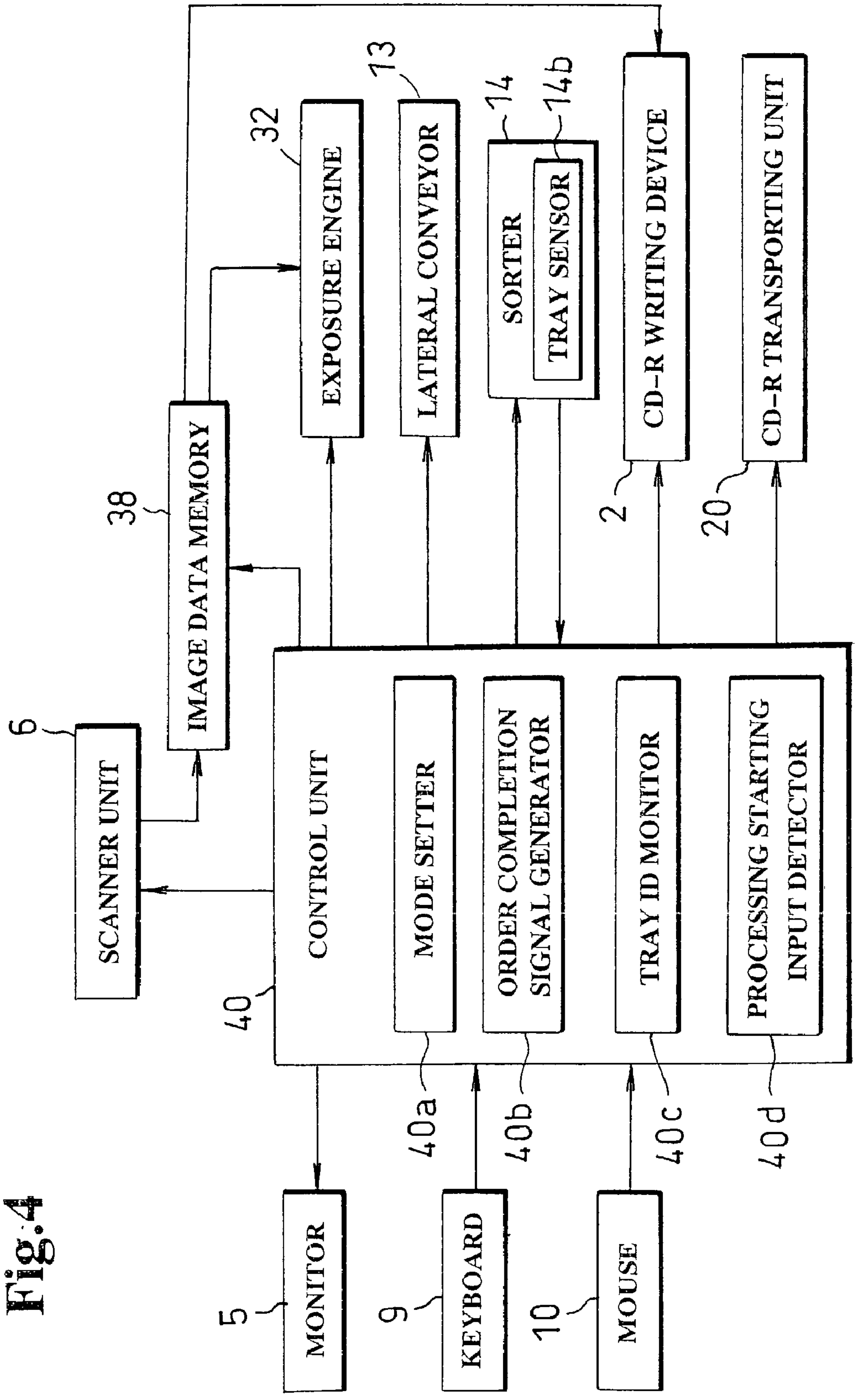
FIG. 4 is a block diagram illustrating the control block arrangement of the photographic processing system.

Next, the control block arrangement of the photographic processing system will be explained below in reference to FIG. 4. A control unit 40 performs the control of each of the operations of the components in the photographic processing system. The control unit 40 comprises hardware such as a CPU, a memory, a hard disk and an interface and software such as control programs.

A mode setter 40*a* stores therein the setting contents of various kinds of modes. Typical modes to be set include a mode in which both of the photographic prints and the CD-R are requested by a customer, a mode in which only the photographic prints are requested by the customer, and a mode in which only the CD-R is requested by the customer. The processing contents or the control contents are varied according to the mode to be set.

An order completion signal generator 40*b* generates a signal upon completion of processing of one order. This signal is generated as soon as the CD-R and the photographic prints of one order are placed on the tray 14*a*. This signal can be generated based on the judgement whether or not the number of operations by the lateral conveyor 13 reaches a predetermined value (corresponding to the number of photographic prints of one order) in the case where, for example, the photographic prints are completed to be placed on the tray. Furthermore, a signal indicating that the CD-R is completed to be placed on the tray can be generated by, for example, detecting the turn of the CD-R picker 24 at an angle of 180°. As described above, the order completion signal can be generated by detecting that both of the photographic prints and the CD-R are completed to be placed on the tray.

A tray ID monitor 40*c* monitors an ID of a currently set tray 14*a*. An inherent ID is applied to each of the trays 14*a* disposed in the collecting unit 14. Such an ID may be attached to the tray by, for example, forming pores of several bits in a plate or forming a bar code at a predetermined position of the tray. The tray ID corresponds one-to-one to an order number. Here, the order number can be input via the keyboard by an operator or can be automatically input based on a bar code seal or the like stuck to the developed negative film.

A processing starting input detector 40*d* detects that a processing starting key is depressed via the keyboard 9. This key input enables the printing processing or the CD-R writing processing to be started.

An image data memory 38 stores therein the image data read out by the scanner unit 6. For example, the image data memory 38 consists of a frame memory. The image data is subjected to a predetermined image processing or the like, and then, is transmitted to the exposure engine 32 or the CD-R writing device 2. Here, the predetermined image processing signifies, for example, the processing of appropriately correcting a color or a density, the color converting processing for the purpose of color matching between an input device and an output device, or the like.

The lateral conveyor 13 is intermittently driven every time one sheet of photographic print is discharged from the print discharging unit 12, so as to transport the photographic print on the tray 14*a*. The sorter 14 includes a tray sensor 14*b*, for detecting the tray ID. The tray sensor 14*b* may consist of a sensor for detecting the pores of several bits formed in the plate or a bar code sensor for detecting the bar code.

<Explanation of Operation>

Figure 5:
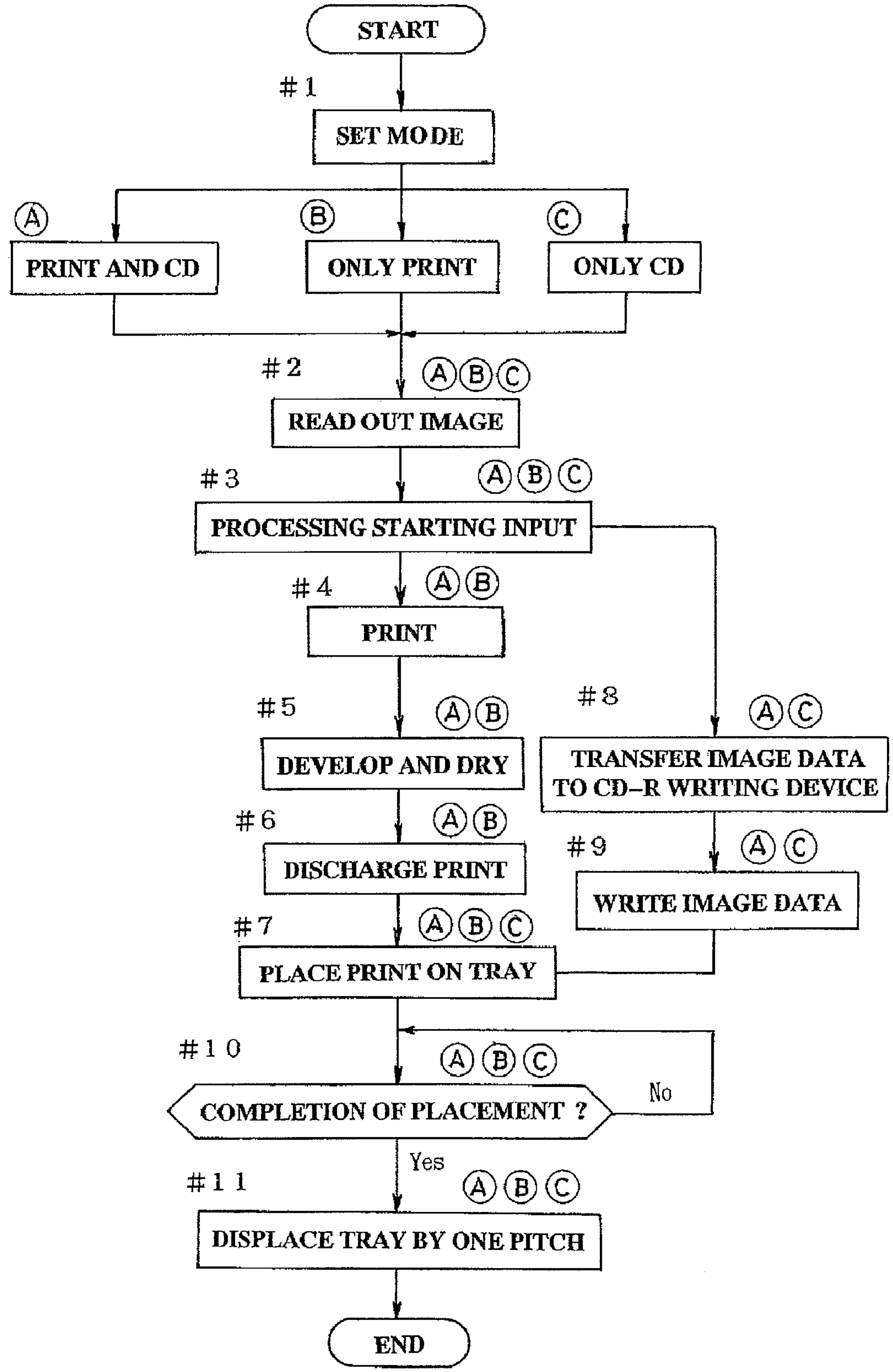
FIG. 5 is a flowchart illustrating procedures when ordering processing is performed by the use of the photographic processing system.

Subsequently, procedures when ordering processing is performed by the use of the photographic processing system, as described above, will be explained below in reference to a flowchart illustrated in FIG. 5.

First of all, the contents (modes) of an order are set (#1). As described already, these modes include the mode (A) in which both of the photographic prints and the CD-R are formed, the mode (B) in which only the photographic prints are formed, and the mode (C) in which only the CD-R is formed. Any one mode is selected among these modes. The order can be set by, for example, selecting an order screen on the monitor 5, so that the mode can be set on that screen. In the flowchart, reference characters (A), (B) and (C) designate relevant modes, respectively.

First, the frame image of the developed negative film is read out (#2). This processing is executed in each of the modes. Information on the order number also is input by the appropriate method, described already. Furthermore, the tray ID of the tray, on which the processed CD-R and photographic prints are placed, is read out. This read-out tray ID corresponds one-to-one to the order number. The photographic prints or the like processed based on the order number are to be placed on the tray having the ID corresponding thereto. Moreover, the same goes for the case where the image forming medium is not the negative film but other kinds of image forming mediums.

After the image is read out, the image processing of correcting a color, a density or the like is performed. Subsequently, a processing starting input is performed (#3). This input is commonly performed in each of the modes. A predetermined processing is started by detecting the input via a processing starting key by the processing starting input detector 40*d*.

After the processing starting input, the printing processing is executed (#4). This processing is performed only in the modes (A) and (B) in which the photographic prints are formed. The printing processing is executed by transferring the image data subjected to the image processing to the exposure engine 32. The exposure engine 32, to which the image data has been transferred, prints off the image at an emulsion applied surface of the sheet of paper under the exposure to light.

The sheet of paper having the image printed off thereon under the exposure to light is subjected to developing and drying processings (#5). And then, the sheet of paper is discharged as a finished photographic print from the print discharging unit 12 to the outside of the apparatus (#6).

The discharged photographic print is transported to and placed on the tray by the lateral conveyor 13 (#7). Incidentally, the steps #5 and #6 are executed only when the photographic prints are formed.

In the meantime, in the modes (A) and (C) in which the CD-R is formed, the processings in steps #8 and #9 are executed. In the case where only the CD-R is formed, after the processing starting input in step #3, the image data is transferred from the image data memory 38 to the CD-R writing device 2 (#8). And then, the image data is written in the CD-R (#9). The image data is written in the writing unit 22 (see FIG. 2). Upon completion of the writing operation, the CD-R is drawn out while being placed on the tray 27, and then, the written CD-R is transferred to the tray 28 by the CD-R picker 24. In the printing unit 21, the index image is printed on the label side of the CD-R. Upon completion of the printing operation, the tray 28 is drawn out again, and then, the CD-R is picked up by the CD-R picker 24. Thereafter, the CD-R picker 24 is turned at an angle of 180°, and then, releases the picked-up CD-R. Consequently, the processed CD-R is placed on the tray 14*a* in the sorter 14. As described above, the placing surface of the tray 14*a* in the sorter 14 corresponds to a collecting region, in which the photographic prints or the CD-R (i.e., the recording medium) in the order unit are collected. Furthermore, each of the trays 14*a* functions as the collecting region.

In the mode in which both of the photographic prints or the CD-R are formed, after the processing starting input in step #3, the control is performed such that both of the printing processing and the CD-R writing processing are started at the same time. A time after the writing and printing processings with respect to the CD-R are completed until the CD-R is placed on the tray 14*a* is shorter than a time after the exposure engine 32 prints off the image on a first sheet of paper under the exposure to light until the first sheet of paper is discharged from the print discharging unit 12. As a consequence, the CD-R is first placed on the tray 14*a* in the sorter 14 all the time (#7).

Since the photographic print has the habit of a curl, there is a fear that the CD-R possibly slips off from the tray 14*a* if the CD-R is placed on the photographic print. Therefore, the writing and printing processings with respect to the CD-R are controlled to be concurrently performed at the same time, so that the CD-R can be first placed on the tray 14*a*. In this manner, the CD-R can be safely placed on the tray 14*a* with certainty.

The photographic prints and the CD-R of the same order are placed on the same tray 14*a*. The photographic prints and the CD-R of the same order are put into the same DP bag, and then, are given to a customer. In this case, since the photographic print and the CD-R are placed on the same tray 14*a*, it is unnecessary to take the trouble to collate the photographic print and the CD-R with each other. Thus, it is possible to alleviate a working burden on an operator.

After the CD-R is placed on the tray, the photographic prints are stacked and placed one by one in sequence on the tray 14*a*. When it is judged that all of the photographic prints of one order are completed to be placed on the tray (#10), the tray 14*a* is displaced by one pitch, and then, a next tray 14*a* is made to wait for a next order (#11). The tray 14*a* is displaced in response to the order completion signal generated by the order completion signal generator 40*b*. When the tray 14*a* is displaced, the tray ID of the newly set tray 14*a* is read out, thereby completing the preparation for the next order.

(Other Embodiments of the Invention)

The recording medium is not limited to the CD-R, and may be a DVD, a floppy disk or the like.

The printing unit 3, the CD-R writing device 2, the sorter 14, the print transporter (i.e., the lateral conveyor), the recording medium transporting unit 20 and the control unit 40 are not limited to the configurations in the above-described preferred embodiment, and therefore, various kinds of modifications can be embodied. For example, the receiver (i.e., the sorter) is not limited to the numerous trays 14*a* in the above-described preferred embodiment, and it may be configured such that the photographic prints and the CD-R may be stacked in one order unit in sequence on one or a plurality of belt conveyors. A specific example of the above-described configuration will be explained below in reference to FIG. 6.

Figure 6:
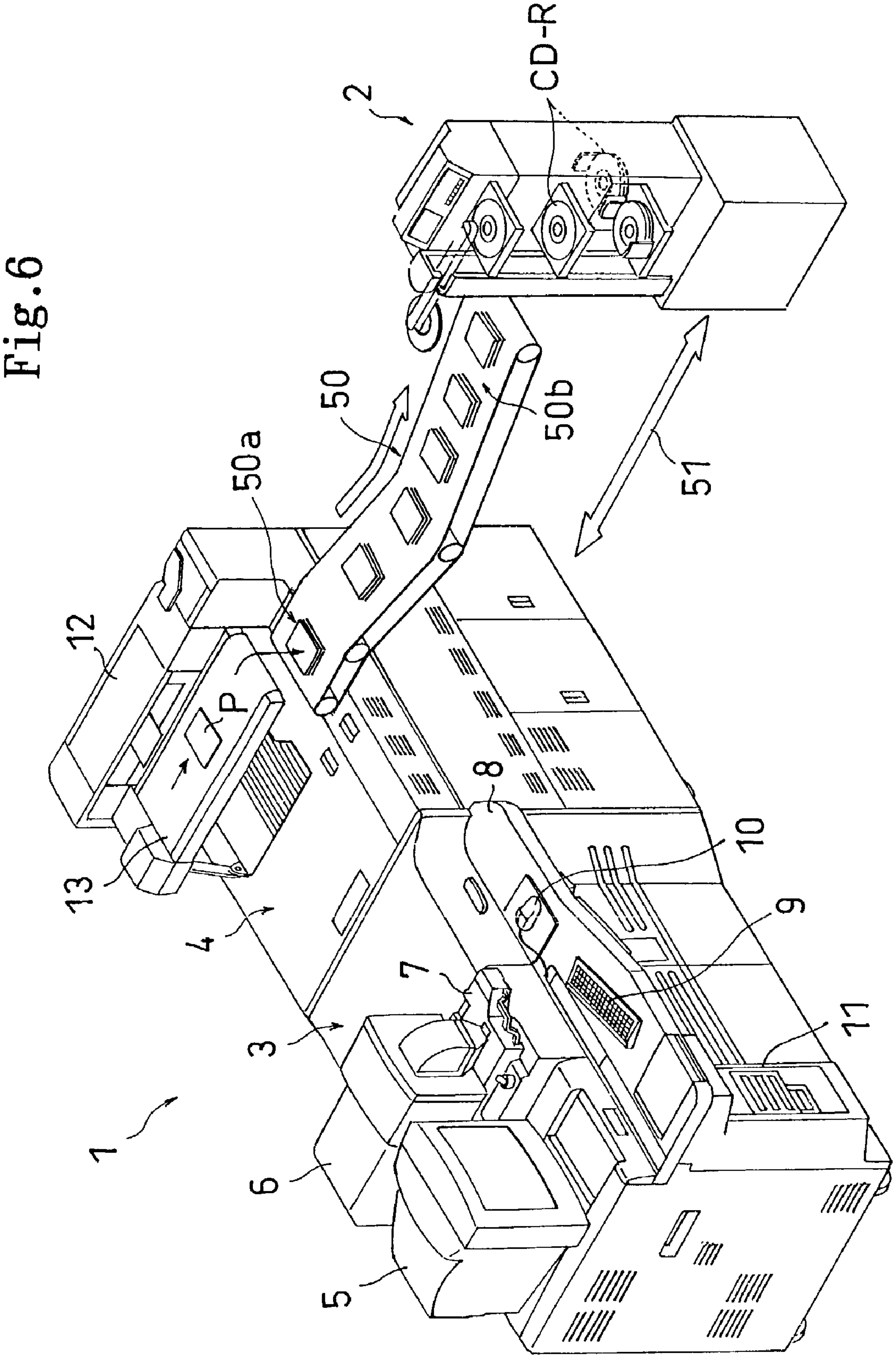
FIG. 6 is a perspective view showing the outside appearance of a photographic processing system in another preferred embodiment.

In FIG. 6, the sorter 14 serving as the collecting unit is replaced with a belt conveyor 50. A photographic print P, which has been laterally transported by a lateral conveyor 13, is made to fall to an area 50*a* at a proximal end of the belt conveyor 50. At this area 50*a* are collected the photographic prints of one order. Until the photographic prints of one order are completed to be collected, the belt conveyor 50 is kept in a stationary state. Upon completion of the collection of the photographic prints of one order, the belt conveyor 50 is driven by a predetermined pitch, and then, the preparation for receiving a next order is performed. In this manner, the belt conveyor 50 is intermittently driven.

At an area 50*b* at a distal end of the belt conveyor 50, a CD-R having image data written therein is placed by a CD-R writing device 2. That is to say, the area 50*b* corresponds to a collecting region. The CD-R may be placed on the photographic prints, which have been transported by the belt conveyor 50, or may placed adjacently to the photographic prints. The CD-R writing device 2 having the same configuration as that shown in FIG. 2 may be used. Here, a printer processor 1 and the CD-R writing device 2 are connected to each other via a communication line 51 or the like, and is controlled such that the photographic prints and the CD-R of the same order can be collected at the area 50*b* at the distal end. An operator simply takes out the photographic prints and/or the CD-R collected at the area 50*b* and puts them into a DP bag.

The image forming medium is not limited to a photographic film such as a negative film or a positive film, and therefore, may be a recording medium for a digital camera or the like.

Furthermore, as to the determination of the order, one negative film can be determined as one order in the case of a request of simultaneous printing of the negative film. However, the determination is not limited to this, and it can be changed appropriately.

What is claimed is:

1. A photographic processing system comprising:

a printing unit for forming photographic prints based on image data read out from an image forming medium;

a recording medium writing device for writing the image data in a recording medium;

a collecting region for collecting the photographic prints and/or the recording medium in an order unit;

a print transporter for transporting the photographic prints formed by the printing unit to the collecting region;

a recording medium transporting unit for transporting the recording medium having the image data written therein to the collecting region; and a control unit for controlling the printing unit and the recording medium writing device in such a manner as to collect the photographic prints and/or the recording medium of the same order in the collecting region, wherein in the case where the photographic prints and the recording medium of the same order are collected together, the control unit performs the control such that the recording medium is first collected in the collecting region, and then, the photographic prints are placed on the recording medium.

2. A photographic processing system comprising:

a printing unit for forming photographic prints based on image data read out from an image forming medium;

a recording medium writing device for writing the image data in a recording medium;

a collecting region for collecting the photographic prints and/or the recording medium in an order unit;

a print transporter for transporting the photographic prints formed by the printing unit to the collecting region;

a recording medium transporting unit for transporting the recording medium having the image data written therein to the collecting region;

a control unit for controlling the printing unit and the recording medium writing device in such a manner as to collect the photographic prints and/or the recording medium of the same order in the collecting region; and a collecting unit having numerous receivers, which are driven to be circulated, each of the receivers functioning as the collecting region, wherein the control unit performs the control such that the recording medium is first placed on the receiver, and then, the photographic prints are placed on the recording medium.

3. A method of photographic processing comprising:

(i) forming photographic prints based on image data read from an image forming medium;

(ii) storing the image data in a recording medium;

(iii) transporting the photographic prints to a collecting region;

(iv) transporting the recording medium having the image data to the collecting region; and (v) collecting the photographic prints and the recording medium at the collecting region in an order unit, wherein steps (i)-(iv) are controlled to collect the photographic prints and the recording medium of the same order substantially at the same time, wherein the photographic prints and the recording medium of the same order are collected together, wherein the recording medium is first collected in the collecting region, and then, the photographic prints are placed on top of the recording medium.

* * * * *